United States Patent
Bryson et al.

(10) Patent No.: US 11,089,137 B2
(45) Date of Patent: Aug. 10, 2021

(54) DYNAMIC DATA TRANSMISSION

(71) Applicant: International Business Machines Corporation, Armonk, NY (US)

(72) Inventors: Donald Lovell Bryson, Chattanooga, TN (US); Eric V. Kline, Rochester, MN (US); Sarbajit K. Rakshit, Kolkata (IN); Gerald Stanquist, Salt Point, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 16/372,456

(22) Filed: Apr. 2, 2019

(65) Prior Publication Data
US 2020/0322460 A1  Oct. 8, 2020

(51) Int. Cl.
G06F 11/22 (2006.01)
H04L 29/06 (2006.01)
G06F 11/30 (2006.01)
H04L 29/14 (2006.01)

(52) U.S. Cl.
CPC .......... H04L 69/08 (2013.01); G06F 11/2221 (2013.01); G06F 11/3006 (2013.01); H04L 69/40 (2013.01)

(58) Field of Classification Search
CPC ............ G06F 11/221; G06F 11/3003; G06F 11/3006; G06F 11/2012; H04L 65/80; H04L 69/40; H04L 43/08; H04L 69/08
See application file for complete search history.

(56) References Cited

U.S. PATENT DOCUMENTS

| | | | |
|---|---|---|---|
| 6,085,251 A | 7/2000 | Fabozzi | |
| 6,765,868 B1 | 7/2004 | Dunn et al. | |
| 8,694,672 B2 | 4/2014 | Zheng | |
| 9,143,553 B2 | 9/2015 | Simcoe | |
| 9,348,832 B2 | 5/2016 | Thing | |
| 9,483,429 B2 | 11/2016 | Paycher et al. | |
| 9,876,770 B1 | 1/2018 | Ekambaram et al. | |
| 9,961,169 B1* | 5/2018 | Koster | H04L 69/18 |
| 10,033,822 B2 | 7/2018 | Masputra et al. | |

(Continued)

FOREIGN PATENT DOCUMENTS

WO     2001054370 A2     12/2001

OTHER PUBLICATIONS

Anonymous, "Bluetooth vs. Wi-Fi," Retrieved from https://www.diffen.com/difference/Bluetooth_vs_Wifi. pp. 3.

(Continued)

*Primary Examiner* — Yolanda L Wilson
(74) *Attorney, Agent, or Firm* — Cantor Colburn LLP; Tihon Poltavets

(57) ABSTRACT

Embodiments of the invention are directed to a computer-implemented method of for data transfer. The method includes a processor detecting a characteristic of a stream of data transferring from a first computing device to a second computing device using a first input/output I/O protocol. The processor detects a change in the characteristic of the data transfer. In response to detecting the change the first I/O protocol in mid-stream, to a second I/O protocol, wherein the data in the stream is reformed to comport with the second I/O protocol, and wherein the change is in response to the change in the characteristic.

11 Claims, 4 Drawing Sheets

(56) References Cited

U.S. PATENT DOCUMENTS

| | | | |
|---|---|---|---|
| 10,078,638 B2 | 9/2018 | Loring et al. | |
| 10,104,523 B2 | 10/2018 | Smadi et al. | |
| 10,178,569 B1* | 1/2019 | Colwell | H04W 24/08 |
| 2006/0092975 A1* | 5/2006 | Ansari | H04L 45/00 |
| | | | 370/469 |
| 2010/0287305 A1* | 11/2010 | Kompella | H04L 43/10 |
| | | | 709/238 |
| 2011/0072127 A1* | 3/2011 | Gerber | H04L 67/2852 |
| | | | 709/224 |
| 2012/0311173 A1 | 12/2012 | Agarwal et al. | |
| 2013/0262660 A1 | 10/2013 | Theroux et al. | |
| 2015/0006748 A1* | 1/2015 | Kashou | H04L 69/08 |
| | | | 709/230 |
| 2015/0256654 A1* | 9/2015 | Oguchi | H04L 43/0841 |
| | | | 709/230 |
| 2016/0056884 A1 | 2/2016 | Dave et al. | |
| 2016/0198021 A1* | 7/2016 | Mooney | H04L 69/24 |
| | | | 370/467 |
| 2018/0329523 A1 | 11/2018 | Mathias et al. | |
| 2019/0068464 A1* | 2/2019 | Bernat | G06F 9/5088 |

OTHER PUBLICATIONS

Davidrajuh, R. (2012). ) Activity-Oriented Petri Net for scheduling of resources. 2012 IEEE International Conference on Systems, Man, and Cybernetics. Oct. 14-17, 2012, pp. 12.

He et al.; "Heterogeneity-Aware Collective I/O for Parallel I/O Systems With Hybrid HDD/SSD Servers", IEEE Trans. on Computers, vol. 66, Iss. 6, pp. 1091-1098, Jun. 1, 2017.

Jing et al.; "Distributed Corrdination Schemes for Multi-Radio Co-Existence in Dense. ORBIT Testbed", DYSPAN 3rd IEEE Symposium on, pp. 1-10, Oct. 14-17, 2008.

Lee et al.; "MPI-IO/L: Efficient Remote I/O for MPI-IO via Logistical Networking", IPDPS 20th IEEE International Symposium on, pp. 1-10, Apr. 25-29, 2006.

Liao et al.; "Dynamically Adapting File Domain . . . Locking Protocols", SC'08 ACM/IEEE International Conference on Supercomputing, pp. 1-12, Nov. 15-21, 2008.

N. K. Prema et al., "International Journal of Computer Science & Communication" vol. 1, No. 1, Jan.-Jun. 2010, pp. 29-32.

* cited by examiner

DYNAMIC DATA TRANSMISSION

BACKGROUND

The present invention generally relates to data transmission, and more specifically, to dynamically changing the file transfer mode during a data stream.

Data transmission is the process of transferring data between at least two computing devices or components in either analog or digital format. Digital data is typically transferred from one device to another device via either serial transmission or parallel transmission. Serial transmission involves the transfer of single data bits in sequence across a single channel. Parallel transmission involves transmitting multiple data bits across multiple channels. Analog transmission involves transferring data through a continuing signal and modifying the amplitude, phase or another characteristic of the signal. In each method, the data is transferred pursuant to an input/out I/O protocol. The I/O protocol establishes the rules and standards by which the data is transferred.

SUMMARY

Embodiments of the present invention are directed to a computer-implemented method for data transfer. A non-limiting example of the computer-implemented method includes a processor detecting a characteristic of a stream of data transferring from a first computing device to a second computing device using a first input/output I/O protocol. The processor detects a change in the characteristic of the data transfer. In response to detecting the change the first I/O protocol in mid-stream, to a second I/O protocol, wherein the data in the stream is reformed to comport with the second I/O protocol, and wherein the change is in response to the change in the characteristic.

Embodiments of the present invention are further directed to a computer system for distributed learning. The computer system includes a memory and a hardware processor system communicatively coupled to the memory. The processor system is configured to perform the computer-implemented method Embodiments of the present invention are further directed to a computer program product for distributed learning. The computer product comprises a computer readable storage medium embodied with program instructions. The instructions are executable by a hardware processor; and cause the hardware processor to perform the computer-implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
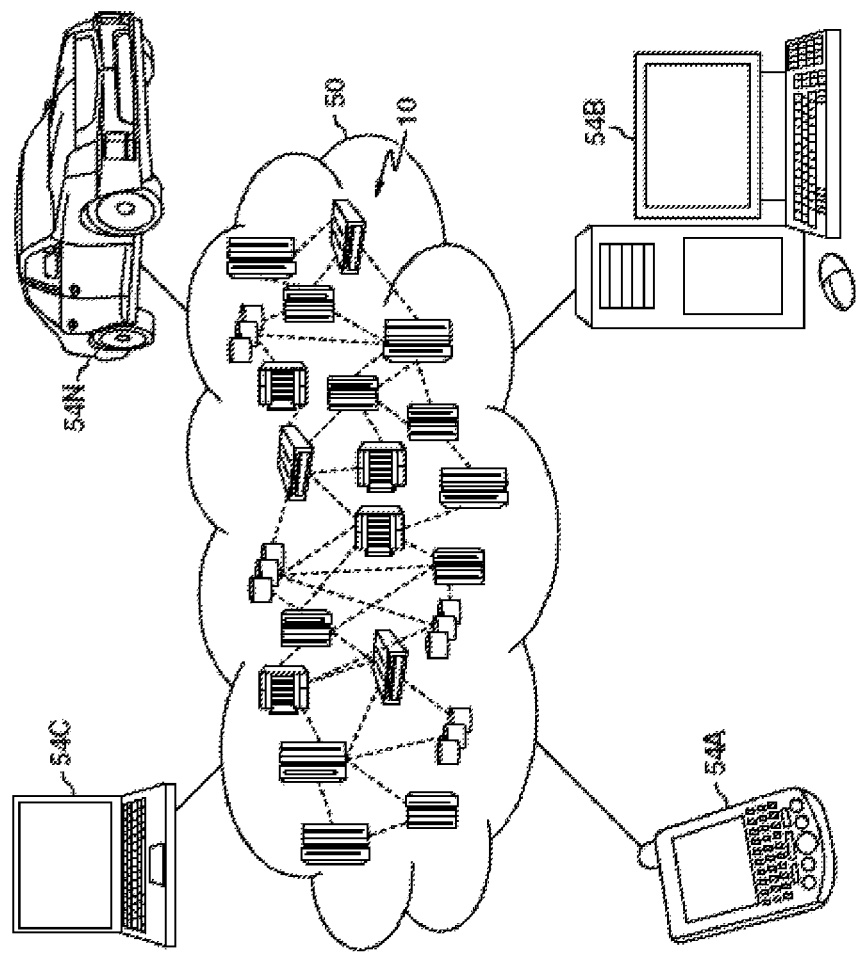
FIG. 1 depicts a cloud computing environment according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
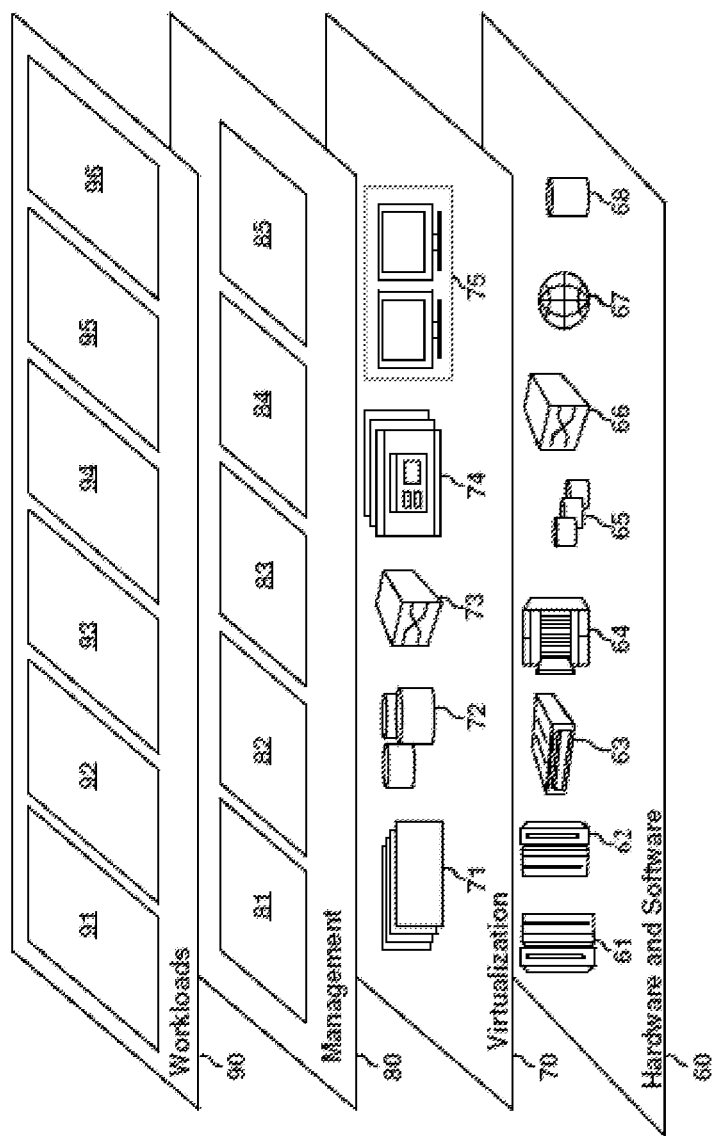
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and changing a data transfer mode 96.

Turning now to an overview of technologies that are more specifically relevant to aspects of the invention. Data is transferred in the form of data packets from a transmitter of one computing device to a receiver of another computing device across different mediums. The data is transferred either directly from one computing device to the other computing device or indirectly through a network of computing devices. The mediums used to transfer the data include conductive wiring, fiber optic cables, wireless transfer, internet-based transfer, and through various external storage devices.

The computing devices each adopt a common input/out (I/O) protocol to establish a common set of rules between the devices as to how the data is transferred. The available I/O protocols include but are not limited to Bluetooth, infrared data association (IrDA), Wi-Fi, Li-Fi, ultrasound, ultra-wideband, cellular, Wi-max, 4G, 5G, LTE, and Zigbee. The I/O protocols respond differently to different conditions and choosing between them includes trade-offs. For example, certain I/O protocols offer an increased data transfer rate, but at the expense of the data integrity. In typical computing devices, once a computing device begins to transfer data under an I/O protocol, unless there is a loss of transmission, the computing device keeps transferring data under the same I/O protocol until the transfer is complete. This static I/O protocol choice does not account for changes in the ambient environment or signal characteristics. As a result, changes in the ambient environment or signal characteristics leads to either a midstream decrease in data transmission quality or failure to switch to a more optimal I/O protocol.

Turning now to an overview of the aspects of the invention, one or more embodiments of the invention address the above-described shortcomings of the prior art by providing method and systems for dynamically changing an I/O protocol midstream. In this sense, the system responds in real time to changes in the ambient environment and/or transmission efficiency to change the I/O protocol to optimize the data transfer from one device to another.

Figure 3:
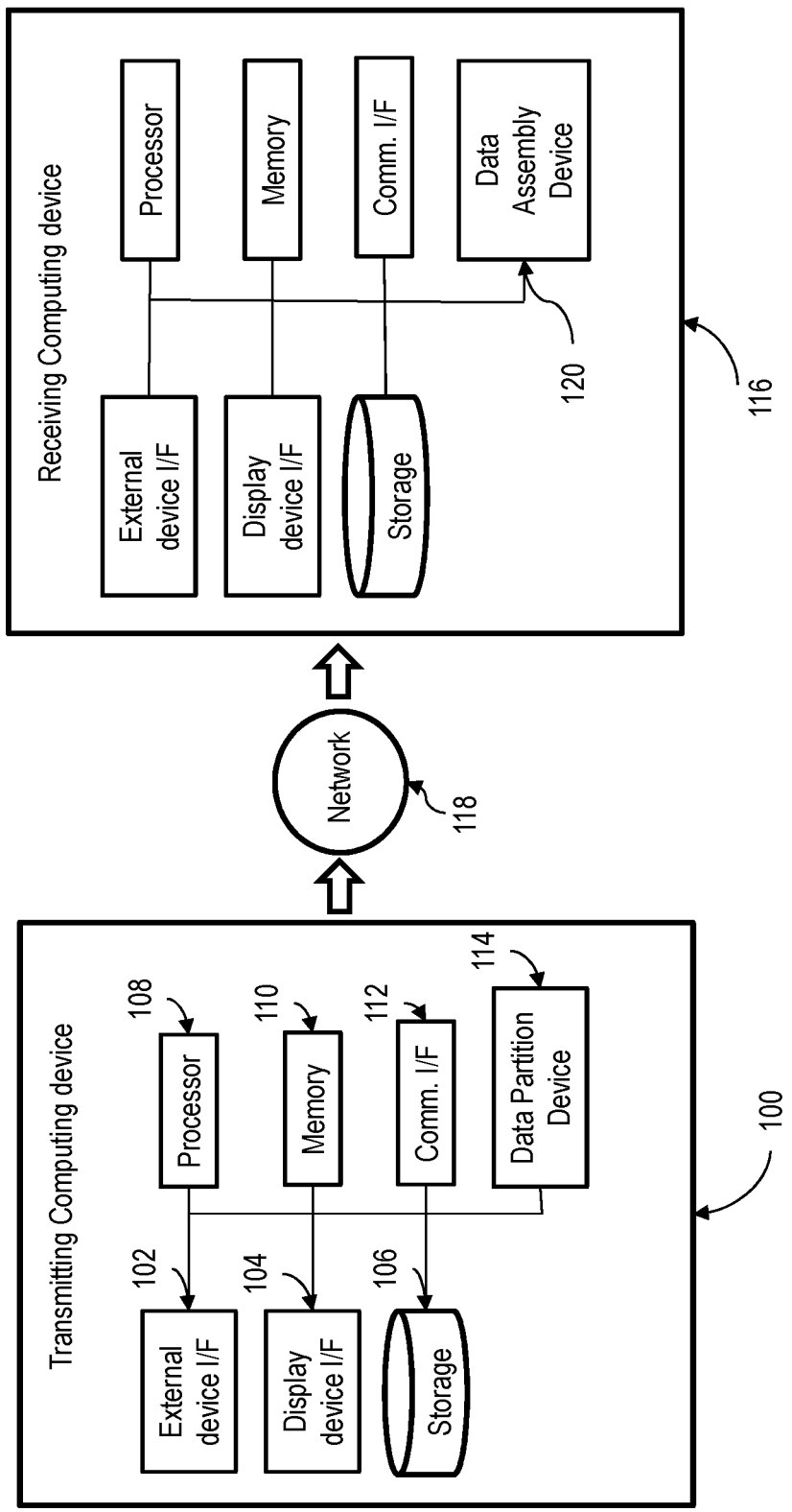
FIG. 3 depicts a block diagram of a system for implementing one or more embodiments of the present invention.

Turning now to a more detailed description of aspects of the present invention, FIG. 3 depicts a system for transferring data according to embodiments of the invention. The transmitting computing device 100, an external device interface 102, a display interface device interface 104, storage 106 a processor 108, memory device 110, communication interface 112, and a data partition device 114.

The transmitting computing device 100 communicates data to a receiving computing device 116 via one or more wired or wireless communications networks 118. The wired or wireless communication networks 118 may be public, private or a combination of public or private networks. The transmitting computing device 100 includes the capability to transmit data via one or more I/O protocols. For example, the user transmission device includes functionality to communicate with near frequency communication, Bluetooth, Wi-Fi, and 5G. In another embodiment, the user transmission device may be coupled to another device (not shown) to enable communication via an I/O protocol unavailable on the transmitting computing device 100. In some embodiments of the present invention, the transmitting computing device is a cloud server node as described above.

The data partitioning device 114 receives a data file and partitions the data. The partitioned data is transmitted through the communication interface 112 through the network 118 to the receiving computing device 116.

The memory device 110 includes a device such as a Dynamic Random Access Memory (D-RAM), Static RAM (S-RAM), or other RAM or a flash memory. The storage device 106 includes one or more external storage devices such as a hard disk, a magneto-optical medium, a flash drive, an optical medium such as a CD-ROM, or another type of device for electronic data storage.

The communication interface 112 includes at least one of a communications port, a wired transceiver, a wireless transceiver, and/or a network card. The communication interface 112 is capable of communicating using two or more of the following: Ethernet, fiber optics, microwave, xDSL (Digital Subscriber Line), Wireless Local Area Network (WLAN), Wi-Fi, Li-Fi, Zigbee, Wi-max, wireless cellular, Bluetooth, and/or any other appropriate technology.

The external device interface 102 includes an interface configured to communicate with one or more external devices. The external device interface 102 is configured to use technology such as universal serial bus (USB), Bluetooth, infrared, serial port, parallel port, and/or other appropriate technology. The external device interface 102 is also configured to receive input data from devices such as a keyboard, a mouse, a touch screen, a touch pad, a stylus pad, and/or other device. Additionally, the external device interface 102 is also configured to communicate output data to an external source (not shown).

The display device interface 104 is an interface configured to communicate data to display (not shown). For example, the display interface device 104 can display data to at least one of a vehicle display, a personal computer or television display, a smartphone display, a liquid crystal display (LCD), and/or a computer-based display. The display device interface 104 communicates data received from the processor 108 or another device (not shown). The display device is either external to the transmitting computing device 100 or alternatively, the display device is included in the transmitting computing device 100.

In embodiments of the present invention, the transmitting computing device 100 may be configured differently to perform any feature or any combination of features described herein. Although FIG. 3 shows that the transmitting computing device 100 includes a single external source device interface 102, a single display device interface 104, a single storage device 106, a single processor 108, a single memory device 110, a single communication interface 112, a single data partition device 114, the transmitting computing device 100 may include multiples of each or any combination of these components, and may be configured to perform any functionality to described herein.

The receiving computing device 116 is similar to the transmitting computing device 100. It should be appreciated that as illustrated the transmitting computing device 100 shows a data partition 114 device and the receiving computing device 116 shows a data assembly device 120, each of the transmitting device 100 and receiving computing device 116 include a respective data partition device 114 and data assembly device 120. The data assembly device 120 receives partitioned data files from the transmitting device 100 and reassembles a data file. Additionally, the receiving computing device 116 determines the integrity of the received data.

The transmitting computing device 100 determines each I/O protocol option available with the receiving computing device 116. In some embodiments of the present invention, this is accomplished when establishing a connection between the transmitting computing device 100 and receiving computing device 116. In an active mode, the receiving computing device 116 monitors for incoming data connections. Along with an FTP command to inform the transmitting computing device as to which port is used to monitor listening, the receiving computing device transmits a list of available I/O protocols. In a passive mode, once the receiving computing device 116 receives an IP address and a transmitting computing device port number, the receiving computing device transmits available I/O protocols to the transmitting computing device 100. The transmitting computing device 100 matches the I/O protocols available to the receiving computing device 116 with its own functionality. In other embodiments of the present invention, the receiving computing device 116 provides the available I/O protocols after the transmitting computing device 100 transmits a password for login authentication.

After the transmitting computing device 100 begins transferring data, the processor 108 continuously monitors the data transfer rate under the current I/O protocol. To accomplish this, the transmitting computing device 100 monitors characteristics of the transmitted data packets. In some embodiments, the transmitting computing device 100 monitors the data transfer rate or bit rate, which is the number of bits that are conveyed or processed per unit of time. To accomplish this, the transmitting computing device 100 transmits test data packets, between or along with the partitioned data packets, that provide instructions for the receiving computing device 116 to calculate and provide a sum of partitioned data packets received within a predetermined period of time. The test data packets are sent via one or more parallel transmission channels or through a single serial transmission channel. In some embodiments of the present invention, the transmitting computing device 100 and receiving computing device 116 establish a schedule for transmitting the test data packets. In other embodiments of the test data packet is sent in response to change in the circumstances. For example, devices equipped with geo-positioning capability, detecting a change in the relative position of the transmitting computing device 100 to the receiving computing device 116. Another change in the circumstance is based on detecting a reduction of data transfer rate, detecting another I/O protocol has become available. For example, when a user moves to an area with available Wi-Fi access and the other computing device already has access to Wi-Fi, the computing devices both become enabled to transmit data through Wi-Fi.

In other embodiments of the present invention, the transmitting computing device 100 periodically sends a ping to the receiving computing device 116. The ping includes a data packet that includes a time stamp of the transmission and instructions for the receiving computing device 116 to respond to the ping and to include a time stamp with the response. In some embodiments, the transmitting computing device 100 and receiving computing device 116 establish a schedule for transmitting the pings.

Periodically, the transmitting computing device 100 also duplicates an instance or instances of partitioned data and transmits the data via each I/O protocol distinct from the current I/O protocol. These test data packets utilize any hardware or software used to format the test data packets to the other I/O protocols not currently being used. For example, if the partitioned data is being transmitted via Bluetooth, a test data packet is formatted and transmitted through Wi-Fi. The transmitting computing device 100 records the amount of data in the duplicated data and includes a time stamp and instructions for the receiving computing device 116 to transmit a return signal with a time stamp. The transmitting computing device then calculates a data transfer rate based on each I/O protocol. The transmitting computing device then compares potential replacement I/O protocols to the current I/O protocol mid-stream.

In some embodiments of the present invention, the transmitting computing device 100 stores a history of changes in a first I/O protocol, changes in the transmission characteristics that led to a change in the first I/O protocol, and the second I/O protocol. In some embodiments, the transmitting computing device 100 automatically changes the I/O protocol based on a data transfer rate falling below a first threshold or a change in the circumstance. In other embodiments, the transmitting computing device 100 provides a user with a menu of I/O protocol options and permits the user to choose a preferred I/O protocol. In some embodiments of the present invention, the transmitting computing device 100 includes a graphical user interface (GUI, not shown) that displays each available I/O protocol. The GUI is configured to display suggested I/O protocols based on the detected characteristics and display the detected characteristics to allow the user to make an informed decision. In some embodiments of the present invention, the user interacts with the GUI to request faster or slower data transfer. The GUI can provide information regarding tradeoffs or costs to faster or slower data transfer.

Figure 4:
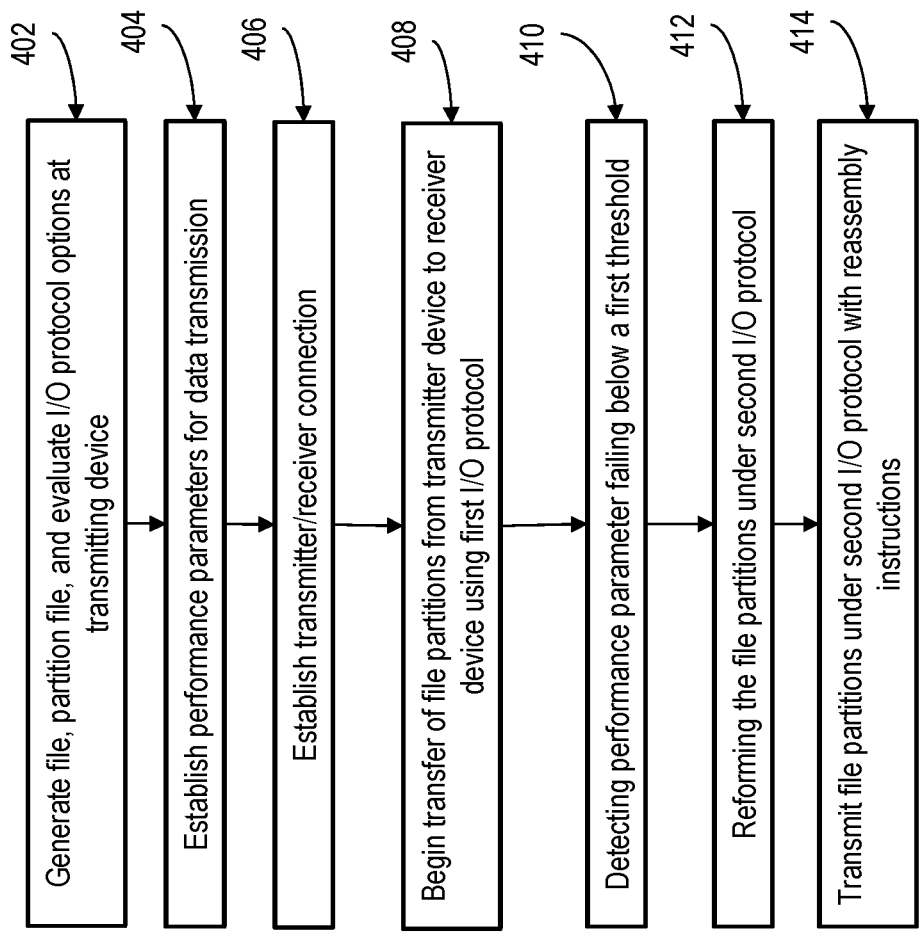
FIG. 4 depicts a flow diagram of a method for data transfer according to one or more embodiments of the present invention.

FIG. 4 depicts a flow diagram of a method for dynamically changing a file transfer mode according to one or more embodiments of the invention. The method 400 includes generating a transfer file, partitioning the file, and evaluating available I/O protocols at the transmitting device at block 402. The transmitting computing device detects its own hardware, software, and any necessary external resources, for example, cellular service or Wi-Fi availability to determine which I/O protocols are available to it. At block 404 the transmitting computing device establishes parameters for data transmission. For example, the transmitting computing device can establish a threshold value acceptable data transfer rate for each available I/O protocol. This threshold can either be hardcoded to the device or established based on a prior data transmission using the respective I/O protocol. At block 406, the transmitting computing device establishes a connection with the receiving computing device. For example, a connection is established through a three-way handshake. The transmitting computing device also receives each I/O protocol available to the receiving computing device and matches I/O protocols between the two devices.

At block 408, the transmitting computing device begins to transfer the partitioned data files using a first I/O protocol. The transmitting computing device continuously monitors the data transfer rate and other transfer characteristics during the transfer. This includes sending out test data packets to monitor response time and data transfer rate using other I/O protocols. At block 410, the transmitting computing device detects that either transfer characteristic has changed. This includes but is not limited to the data transfer rate, location of the transmitting and receiving computing devices, available power, or user input. At block 412 the transmitting computing device reforms the remaining partitioned data to conform to a second I/O protocol. At block 414, the transmitting computing device transmits the remaining partitioned data in the second I/O protocol with reassembly instructions. The receiving computing device reassembles the partitioned data using the instructions from the transmitting computing device.

Additional processes may also be included. It should be understood that the processes depicted in FIG. 4 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for data transfer, the method comprising: partitioning, by a processor, a stream of data from a first computing device to a second computing device; detecting, by the processor, a plurality of input/output (I/O) protocols available to the first computing device; detecting, by the processor, a plurality of I/O protocols available to the second computing device; determining, by the processor, each I/O protocol available to both the first computing device and the second computing device; detecting, by the processor, a characteristic of the stream of data transferring from the first computing device to the second computing device using a first I/O protocol; detecting, by the processor, a change in the characteristic of the data transfer; transmitting, by the processor, test data packets between the partitioned data, wherein each test data packet uses a respective I/O protocol available to both the first computing device and second computing device, and wherein each test data packet includes instructions for a response by the second computing device to the first computing device; and changing, by the processor, the first I/O protocol in mid-stream, to a second I/O protocol, wherein the data in the stream is reformed to comport with the second I/O protocol, and wherein the change is in response to the change hi the characteristic.

2. The computer-implemented method of claim 1, wherein the change in the characteristic is a change in a data transfer rate between the first computing device and the second computing device.

3. The computer-implemented method of claim 1, wherein the test data packets are transmitted periodically based on a schedule created by the first computing device and the second computing device.

4. The computer-implemented method of claim 3, wherein the second I/O protocol is based on the response from the second computing device to the first computing device.

5. A system for data transfer, the system comprising:
a processor communicatively coupled to a memory, the processor configured to: partition a stream of data from a first computing device to a second computing device; detect a plurality of input/output (I/O) protocols available to the first computing device; detect a plurality of I/O protocols available to the second computing device; determine each I/O protocol available to both the first computing device and the second computing device; detect a characteristic of a stream of data transferring from the first computing device to the second computing device using a I/O protocol; detect a change in the characteristic of the data transfer; transmit test data packets between the partitioned data, wherein each test data packet uses a respective I/O protocol available to both the first computing device and second computing device, and wherein each test data packet includes instructions for a response by the second computing device to the first computing device; and change the first I/O protocol in mid-stream, to a second I/O protocol, wherein the data in the stream is reformed to comport with the second I/O protocol, and wherein the change is hi response to the change in the characteristic.

6. The system of claim 5, wherein the change in the characteristic is a change in a data transfer rate between the first computing device and the second computing device.

7. The system of claim 5, wherein the test data packets are transmitted periodically based on a schedule created by the first computing device and the second computing device.

8. The system of claim 7, wherein the second I/O protocol is based on the response from the second computing device to the first computing device.

9. A computer program product for data transfer, the computer product comprising a computer readable storage medium having program instructions embodied therewith, the instructions executable by a processor to cause the processor to: partition a stream of data from a first computing device to a second computing device; detect a plurality of input/output (I/O) protocols available to the first computing device; detect a plurality of I/O protocols available to the second computing device; determine each I/O protocol available to both the first computing device and the second computing device; detect a characteristic of a stream of data transferring from the first computing device to the second computing device using a first I/O protocol; detect a change in the characteristic of the data transfer; transmit test data packets between the partitioned data, wherein each test data packet uses a respective I/O protocol available to both the first computing device and second computing device, and wherein each test data packet includes instructions for a response by the second computing device to the first computing device; and change the first I/O protocol in mid-stream, to a second I/O protocol, wherein the data in the stream is reformed to comport with the second I/O protocol, and wherein the change is in response to the change in the characteristic.

10. The computer program product of claim 9, wherein the change in the characteristic is a change in a data transfer rate between the first computing device and the second computing device.

11. The computer program product claim 9, wherein the test data packets are transmitted periodically based on a schedule created by the first computing device and the second computing device.

* * * * *